US010826711B2

(12) United States Patent
Barry

(10) Patent No.: US 10,826,711 B2
(45) Date of Patent: Nov. 3, 2020

(54) PUBLIC KEY INFRASTRUCTURE AND METHOD OF DISTRIBUTION

(71) Applicant: Westgate Cyber Security Limited, Cwmbran (GB)

(72) Inventor: Marc Barry, Cardiff (GB)

(73) Assignee: Enclave Networks Limited, Cwmbran (GB)

( * ) Notice: Subject to any disclaimer, the term of this patent is extended or adjusted under 35 U.S.C. 154(b) by 0 days.

(21) Appl. No.: 15/765,852

(22) PCT Filed: Sep. 27, 2016

(86) PCT No.: PCT/GB2016/052994
§ 371 (c)(1),
(2) Date: Apr. 4, 2018

(87) PCT Pub. No.: WO2017/060675
PCT Pub. Date: Apr. 13, 2017

(65) Prior Publication Data
US 2018/0287803 A1    Oct. 4, 2018

(30) Foreign Application Priority Data
Oct. 7, 2015 (GB) .................................. 1517730.6

(51) Int. Cl.
*H04L 29/06* (2006.01)
*H04L 9/32* (2006.01)
(Continued)

(52) U.S. Cl.
CPC ............ *H04L 9/3263* (2013.01); *H04L 9/006* (2013.01); *H04L 9/0825* (2013.01); *H04L 9/321* (2013.01)

(58) Field of Classification Search
CPC ..... H04L 9/3263; H04L 9/321; H04L 9/0825; H04L 9/006
See application file for complete search history.

(56) References Cited

U.S. PATENT DOCUMENTS 7,036,010 B2 * 4/2006 Wray .................. H04L 63/0281
                                                    709/223
9,736,145 B1 * 8/2017 Hayes ................. H04L 63/0823
(Continued)

FOREIGN PATENT DOCUMENTS

WO     WO00/01108 A2      1/2000
WO     WO2007073603 A1    7/2007

OTHER PUBLICATIONS

Koshutanski et al., "Distributed Identity Management Model for Digital Ecosystems", the International Conference on Emerging Security Information, Systems, and Technologies (Secureware), Date of Conference: Oct. 14-20, 2007.*
(Continued)

*Primary Examiner* — Morshed Mehedi
(74) *Attorney, Agent, or Firm* — Gordon & Jacobson, P.C.

(57) ABSTRACT

The invention provides a computer-implemented method for validating the respective identities of co-operating entities on a computer network, and comprises generating, transmitting or exchanging a signed digital certificate. The certificate includes a public key associated with an entity on the network; and an arbitrary identifier associated with the public key. The identifier is arbitrary such that the identity of the entity cannot be, or is unlikely to be, discerned from the identifier alone; and/or its generation is random or pseudo-random; and/or selection of the identifier is not related to the identity of the entity or the public key. The certificate is generated and issued by a Certificate Authority in response to a Certificate Signing Request from the entity. In order to validate each other's identities, entities on a network exchange their arbitrary identifiers. Preferably, the exchange is conducted in person or some other manner which enables or facilitates detection of a man-in-the-middle attack, or reduces the likelihood of such an attack. The invention (Continued)

provides a lightweight public key infrastructure which includes a certificate authority arranged to generate the arbitrary identifier and sign and issue the digital certificate. It also comprises a discovery service component to: access and/or update a register of entities in response to a registration request from an entity on a network; record the location of an entity on a computer network based on registration made using the digital certificate; and/or introduce entities to one another. The discovery service component is also arranged to transmit a network address and/or reachability information for an entity on a network to another entity.

15 Claims, 4 Drawing Sheets

(51) Int. Cl.
*H04L 9/00* (2006.01)
*H04L 9/08* (2006.01)

(56) References Cited

U.S. PATENT DOCUMENTS

| | | | |
|---|---|---|---|
| 10,057,225 B1 | 8/2018 | Hayes | |
| 2002/0093915 A1* | 7/2002 | Larson | H04L 63/0272 370/235 |
| 2007/0079113 A1 | 4/2007 | Kulkarni et al. | |
| 2008/0028206 A1* | 1/2008 | Sicard | H04L 63/0407 713/156 |
| 2008/0040606 A1* | 2/2008 | Narayanan | H04L 63/08 713/169 |
| 2009/0125646 A1 | 5/2009 | Rosenan et al. | |
| 2011/0055556 A1 | 3/2011 | Choi | |
| 2011/0113241 A1 | 5/2011 | Umezawa | |
| 2013/0046973 A1* | 2/2013 | Resch | H04L 9/085 713/156 |
| 2013/0086377 A1* | 4/2013 | Cilfone | H04L 9/085 713/156 |
| 2013/0111166 A1* | 5/2013 | Resch | G06F 11/1076 711/162 |
| 2013/0339246 A1* | 12/2013 | Martin | G06Q 20/3821 705/44 |
| 2015/0372813 A1 | 12/2015 | Brand | |
| 2016/0359636 A1 | 12/2016 | Kreft | |

OTHER PUBLICATIONS

Sharma et al., "A global name service for a highly mobile internetwork", ACM Sigcomm Computer Communication Review, Aug. 2014.*

"Internet X.509 Public Key Infrastructure Certificate and Certificate Revocation List (CRL) Profile; rfc5280.txt", D. Cooper et al., May 5, 2008, XP15057243A.

Public key infrastructures and digital certificates for the Internet of things, Schukat et al., 26th Irish Signals and Systems Conference (ISSC), Date of Conference Jun. 24-25, 2015.

Search Report dated Feb. 1, 2016 of Application No. GB1517730.6.

Examination Report dated Jan. 14, 2020 of Application No. GB1517730.6.

* cited by examiner

PUBLIC KEY INFRASTRUCTURE AND METHOD OF DISTRIBUTION

CROSS-REFERENCE TO RELATED APPLICATIONS

This application is the national stage of International Patent Application No. PCT/GB2016/052994 filed on Sep. 27, 2016, and which claims priority to British Patent Application Nos. GB1517730.6 filed on Oct. 7, 2015, all of which are hereby incorporated by reference in their entireties as if fully set forth herein.

BACKGROUND

1. Field

This invention relates generally to authentication methods and systems, and more particularly to public key infrastructure (PKI) and to the verification of parties wishing to establish secure connections for computer-based communication. The invention is particularly suited for use by co-operating parties who wish to utilise knowledge of each other's public keys prior to establishing a secure connection. It provides an infrastructure for public key distribution.

2. Related Art

Many systems use public key cryptography as a building block for confidential communications. These cryptographic protocols are based on algorithms which require two mathematically paired keys. The public key can be distributed freely, while the private key is kept secret. In use, when participants wish to establish a confidential communication using public key cryptography, they exchange public keys but keep their private keys secret. Thus, one party can use a public key to encrypt data at the transmitting end of a connection, and another party can decrypt it at the receiving end using the secret, private key. Public key cryptography can also be used in ephemeral key construction which allows parties to agree on a secret shared key. This exchange is signed using the private keys of each participant, and the public key is used to validate the signatures.

However, the use of public key cryptography presents a common set of logistical problems:
1. Identity validation
    How can we be sure that Alice is the same Alice that we think she is?
2. Public key distribution
    How do we gain knowledge of Alice's public key, and how does she gain knowledge of ours?
3. Public key authenticity
    How do we validate that the public key we obtained for Alice is actually her public key?

Public key cryptography is commonly used in situations where computers connect with one another using a client-server topology (eg web server and browser) with little opportunity for the end user to perform real-life identity validation of the remote party. A Certificate Authority (CA) acts as a common, trusted third party. Within the field of public key infrastructure (PKI), the CA is responsible for verifying the identities of the users of the system. The CA's task is to link a name and public key together, and it does this by issuing cryptographically signed digital certificates to users. The CA issuing the certificate must be trusted to have properly checked the identity of the private key holder, and be diligent in binding their public key to a given, meaningful and world-unique name eg MyCompany.com or MyCompany Limited.

This name-to-key binding is performed because public keys are large, whole numbers, often represented with a binary-to-text encoding scheme such as base 64. Such numbers are not easily remembered or manipulated by human users. Thus, manual handling of public key values is a confusing, cumbersome, time consuming, error prone and undesirable task for end users. Accordingly, Certificate Authorities provide meaningful and world-unique name-to-public key mappings for end users via certificates on the premise that humans find it easier to handle short names, than long numbers or encoded text.

Thus, consider a scenario wherein Bob wishes to establish a secure connection with Alice. Bob's endpoint software receives a digital certificate, signed by a trusted CA. If the name on the certificate matches the name Alice has provided, and the end point which sent the certificate to Bob can demonstrate knowledge of the private key corresponding to the public key on the certificate, Bob can surmise that Alice is the owner of this certificate and that Alice really is the end point with whom he is communicating.

However, the assumption that connecting parties cannot validate one another's identities in person is not universally appropriate. In many cases, the parties communicating are already known to one another. According to conventional PKI, to use certificates such parties must still suffer the inconvenience of proving their identities to the trusted third party for audit, or establish their own certificate-issuing infrastructures for private use. Virtual private networks (VPNs) are a well-known example of a class of connections which are often setup with mutual intent between groups of well-defined participants who invariably share a real-world relationship with one another. As the connecting parties are mutually known to each other, and cooperative, they are able to perform direct and in-person validation of one another's identities.

Therefore, in situations pertaining to mutually known and co-operating parties, the remaining question becomes how to perform the exchange of public keys. A trusted third party (eg CA) is not necessarily required for the participants to gain confidence of each other's identities during the public key exchange, but if the CA is removed from the process then the parties are not able to utilise the easier-to-handle name-to-key mapping that is conventionally provided by the CA.

SUMMARY

Thus, it is desirable to provide a solution which enables reliable, simple and efficient public-key distribution between parties who are able and willing to assume an in-person responsibility for validating each other's identities. Such a solution should ideally comprise a short-form, human friendly identifier for a public key, to provide an alternative mechanism for the conventional meaningful name-to-key mapping provided by the CA.

Such an improved solution has now been devised. Thus, in accordance with the present invention there is provided a solution as defined in the appended claims.

Therefore, in accordance with the invention there is provided a computer-implemented method for validating the respective identities of co-operating entities on a computer network, the method comprising the step of:
   generating, transmitting or exchanging a signed digital certificate comprising:

a public key associated with an entity on the network; and an arbitrary identifier associated with the public key.

The method may provide a mechanism for exchanging public keys, validating identities, and/or establishing secure communications between entities on a network. The network may be any type of electronic network. It may be a wireless network. It may provide a mechanism for establishing a VPN in a simple, secure and fast manner. It may described as an authentication method for establishing the identities of participants in a PKI. It may be used for authenticating parties associated with or registered for participation in a VPN.

The public key may be part of a public-private key pair. The key pair may be generated by the entity. The entity may be an endpoint device on a computer network, or a software component, or a user. The entity may be a party having access to a computer network and wishing to establish a secure, electronic communication with another entity.

Preferably, the identifier is arbitrary such that the identity of the entity cannot be discerned from the identifier alone. The identifier may be referred to as a random identifier. The identifier may be used as a distinguished name on the digital certificate. It may be digitally signed into the certificate with the public key. The identifier may be mapped to, or associated with, the public key by a Certificate Authority.

Preferably, the arbitrary identifier is short relative to the public key. This provides the advantage that human users can more easily manipulate and use the arbitrary identifier.

The digital certificate may be generated and/or issued by a Certificate Authority (CA). The CA may issue the certificate to the entity in real-time. It may issue it as a machine-to-machine communication between the entity and CA without the involvement of a user. Thus, it may be a fully automated process. The CA may maintain a database or other record to store the identifier and its corresponding public key.

Additionally or alternatively, the digital certificate may be generated in response to a Certificate Signing Request (CSR). The CSR may comprise the public key. The CSR may be sent to the CA from the entity via a wireless network.

Additionally or alternatively, the digital certificate may be transmitted from said entity to at least one other entity on the network. Transmission may be conducted over a computer or telecommunications network. It may be transmitted wirelessly.

The arbitrary identifier may not be world unique. However, it is, preferably, unique to the issuing CA in the sense that the CA will not associate that same identifier with any other public key. The CA may maintain a long-term, append-only record of all identifiers that it has ever generated, and the public keys to which those identifiers are mapped.

Preferably, the identifier is arbitrary in the sense that it is meaningless, and preferably not tied to or generated with reference to a user or endpoint's identity. This provides the advantage that a third party cannot identify the owner of a digital certificate by gaining knowledge of the identifier alone. As the identifier is not a secret value, and is intended to be shared, it can be transferred over a non-secure communication channel, and does not need to be kept confidential.

Preferably, the method further comprises the step of generating the arbitrary identifier using:
i) a dictionary;
ii) a hash or obfuscation function;
iii) a first-come-first-served basis;
iv) a random or pseudo-random data source; and/or
v) an incrementing counter.

Preferably, the method further comprises the step of exchanging arbitrary identifiers between entities. Preferably, the exchange of identifiers may be conducted in person or some other manner which enables detection of a man-in-the-middle attack.

Preferably, the entity provides an indication of knowledge of the private key associated with the public key. The indication of knowledge may be provided to a Certificate Authority as part of a Certificate Signing Request; at least one other entity as part of a validation process; and/or a discovery service component arranged to provide directory, registration and/or relay services to a plurality of entities on a computer network.

The discovery service component (DS) may be a software component. It may provide a traffic relay capability between entities on the network. Entities on the network may use the DS to register their presence on the network. The DS may provide reachability information relating to entities on the network to other entities. The DS may facilitate connection of one entity to at least one other entity. The DS may be configured to store and/or display at least one identifier associated with an entity on the network. The DS may provide an address book or record which an entity may use to store information, including arbitrary identifiers, relating to other entities on the network.

The CA may require a demonstration from the entity that it has the private key which corresponds to said public key. The CA may issue a random challenge (e.g. a nonce value) to the entity. The entity may sign the challenge with a private key and send the signature back to the CA. This may enable the entity to provide evidence that the entity owns the private key for the public key.

Also in accordance with the invention there is provided a computer-implemented system arranged and configured to perform the method of any embodiment described above.

Preferably, the system comprises:
a certificate authority arranged to generate a signed digital certificate comprising:
a public key associated with an entity; and
an arbitrary identifier associated with the public key.
Preferably, the certificate authority is arranged and configured to:
generate the digital certificate in response to a Certificate Signing Request from the entity;
maintain a record of digital certificates generated by the certificate authority; and or issue and/or transmit the digital certificate to the entity.
Preferably, the system comprises:
a discovery service component arranged to provide directory, registration and/or relay services to a plurality of entities on a computer network.

Preferably, the discovery service component is arranged and configured to access and/or update a register of entities in response to a registration request from an entity on a network.

Preferably, the discovery service component is arranged to record the location of an entity on a computer network based on registration made using the digital certificate; and/or introduce entities on the network to one another.

Preferably, the discovery service component is arranged to transmit a network address and/or reachability information for an entity on a network to another entity.

Thus, embodiments of the invention provide a lightweight public key infrastructure which facilitates public-key distribution between parties who are willing and able to verify each other's identities.

It should be noted that any feature described above in relation to one aspect of the invention may also be present in on or more other aspects of the invention. For example, a feature described above in relation to a method of the invention may also be applicable to a system of the invention.

These and other aspects of the present invention will be apparent from and elucidated with reference to, the embodiment described herein. An embodiment of the present invention will now be described by way of example, and with reference to the accompanying drawings.

DETAILED DESCRIPTION

Figure 1:
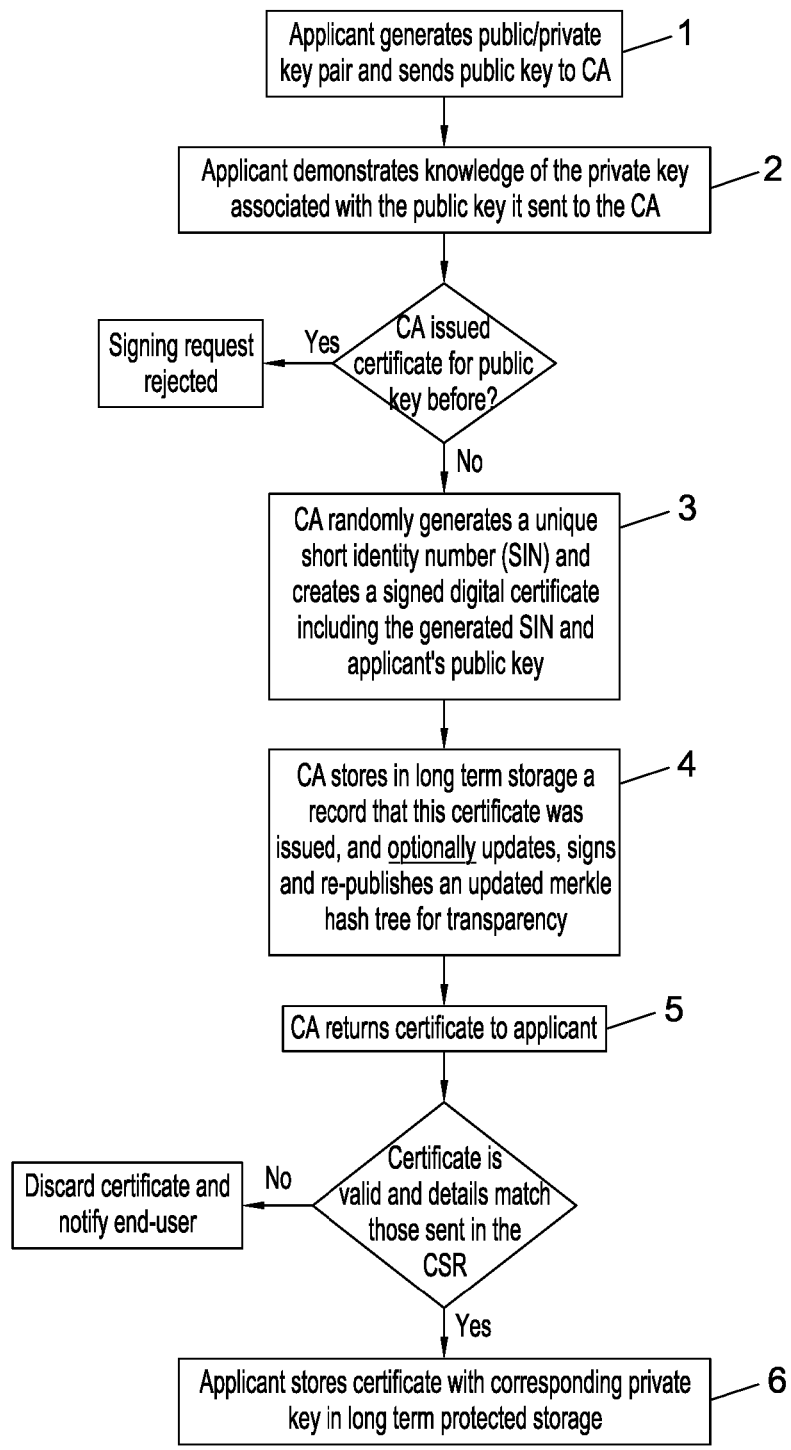
FIG. 1 illustrates a certificate issuing process performed by a third party acting as a Certificate Authority in accordance with an illustrative embodiment of the invention.

The following terms are used hereafter:
Certificate
    A digital tamper-resistant, non-spoofable data block issued by a CA stating that an end-user's public key belongs to SIN chosen by the same CA.
Certificate authority (CA)
    A trusted third party between EP's which is responsible for issuing unique SIN strings
Certificate signing request (CSR)
    The CSR is a block of encrypted text that contains the public key chosen by the applicant.
Discovery service (DS).
    A system which provides directory services, registration services and traffic relaying services to EPs.
Endpoint (EP)
    A computing device belonging to an end-user in possession of one or more public/private key-pairs.
End-user(s)
    Owners and operators of endpoints
Public key infrastructure (PKI)
    A set of software, people, policies, and procedures needed to create, manage, distribute, use, store, and revoke digital certificates.
Short identity number (SIN)
    A non-secret identifier, chosen at random (arbitrarily) by a CA to be used as a distinguished name on a digital certificate. Each SIN is unique to a given public key. The terms 'SIN' and 'distinguished name' may be used interchangeably. The value is designed so as to be short in length (compared to a full public key) and is digitally signed into a certificate with an EP's public key. It should be noted that the use of the term 'SIN' does not imply that only numeric digits are used in the distinguished name. The invention is not limited in this regard. For example, the SIN can comprise numbers, letters, symbols etc, or any combination thereof.

The invention provides a lightweight public key infrastructure which facilitates public-key distribution between parties who are willing and able to verify each other's identities. The invention provides a convenient short-form name which can be distributed in place of the full public key by the end-user, and combines this with a requirement that the end-user performs identity validation (as opposed to a trusted third party as per conventional solutions).

The parties may be referred to as 'endpoints', 'entities', 'participants' or 'users' but, essentially, may be any party having access to a computer network and wishing to establish a set up a secure, electronic communication with another party. The parties must have some real-world knowledge of one another to the point where they are capable of validating each other's identities. The parties can include any type of computer-based resource such as computing devices or software-based resources. For the sake of convenience, the term 'endpoint' will be used hereafter.

After they have verified each other's identities, the parties are able to establish a secure connection for communication. The manner or type of connection which is established subsequent to verification is not dictated by the invention. Any suitable communication method or protocol can be utilised. The invention also assumes that each endpoint is in possession of at least one public/private key pair. The key pair is generated by the endpoint themselves 1.

An embodiment of the invention in use can be described in overview as follows:
1. Request for certificate (see FIG. 1):
    an endpoint sends a CSR to a CA; the CSR includes the endpoint's public key and a demonstration that the endpoint knows the corresponding private key 1, 2. It is important to note that the CSR does not need to include any information relating to the endpoint's real-world identity;
2. CA creates and signs digital certificate (see FIG. 1):
    the CA generates a SIN for the public key; the CA generates a new certificate in response to receipt of the CSR 3 which includes the endpoint's public key and the unique SIN value as the distinguished name; the digitally signed certificate is returned to the endpoint in response to the CSR; the CA maintains a database to record the SIN and its corresponding public key 4. Optionally, the CA updates and signs and re-publishes an updated merkle hash tree for transparency.
    steps 1 and 2 are performed by each endpoint wishing to use the public-key infrastructure of the invention, but no two identical SINs are used within the infrastructure;
3. Parties wishing to connect with each other exchange the distinguished names on their certificates (see FIG. 2)
    the parties exchange their SINs using communication means or methods which are resistant to man in the middle attacks, or at least detectable as such; this may be an in-person exchange; such communication methods make use of the parties' knowledge of each other eg telephone number, facial/voice recognition etc
4. endpoints make contact: (see FIG. 3)
    Software on Alice and Bob's endpoints contact a Discovery Service which facilitates a direct connection; the software performs a certificate exchange during which each certificate owner demonstrates knowledge of their respective private key by signing a nonce supplied by the other party 5. Identity verification:
    the software on the endpoints check that the distinguished name on the certificate they have received matches that which was provided in step 3; they validate that the certificate is from the trusted CA, and validate the knowledge of private key;

thus, the software is primed, in advance of certificate exchange to expect a particular value e.g. FNQH as a distinguished name on a certificate for a given endpoint. The software maintains an address book or other record which stores the distinguished names for the endpoints that a user 'knows' eg Bob's software stores the distinguished name of FNQH for Alice. So if Bob then receives a certificate purporting to be from Alice with a distinguished name of FFEF, his software knows to discard the communication.

6. Connection or failure:
    If validation step 5 succeeds for both parties, the connection can be set up; if not, the connection attempt fails.

The above is described in more detail as follows.

The endpoint generates a public/private key pair and sends a certificate signing request (CSR) to a third party acting as a Certificate Authority (CA). The CSR includes the participant's public key 1. The CA arbitrarily selects a random or pseudo random identifier to pair with the endpoint's public key 3. The identifier is hereinafter referred to as a Short Identity Number (SIN) and is used as a distinguished name.

The arbitrary SIN is not world unique, such as a domain name or company name, for example. However, it is unique to the issuing CA in the sense that the CA will not associate that same identifier with any other public key during its lifetime. The CA maintains a long-term, append-only record of all SINs that it has ever generated, and the public keys to which those SINs were mapped 4.

The assigned SIN is arbitrary in the sense that it is meaningless, and not tied to or generated with reference to a user or endpoint's identity. This is important because as the SIN is meaningless in any real-world context. The SIN does not need to be kept secret and can be shared over a non-secure communication medium.

The length of a public key makes manual sharing between humans impractical. In accordance with the invention, the CA serves to create a mapping between a public key and a short, readable name or number which can be exchanged more easily than a public key. The SIN is intended to be shorter in length relative to the public key. This provides a significant advantage to an end user in that a SIN can be more easily communicated and more expediently exchanged between human users than full public keys. Therefore, the shorter the SIN the easier it is for a human to remember, manipulate and detect forgery. The use of the arbitrary SIN as a distinguished name on a certificate provides a user-friendly mechanism for public key exchange.

SIN Generation

The SIN can be generated in a variety of ways including, for example:
1. Maintaining an integer counter on the CA and incrementing it each after each new certificate is generated; the value of the counter can be used as the SIN on the certificate.
2. As in point 1 above, but hashing the number into a unique alphanumeric string ('unique' in respect of certificates that the CA has previously issued)
3. Collecting entropy from a pseudo random number generator and generating a new alphanumeric string for every certificate; checking the entire database of previously issued names to ensure that the randomly generated string has never been used before
4. As in point 1, or point 3; converting the output into a unique sequence of word strings using a large dictionary of short, easy to memorize words ('unique' in respect of certificates that the CA has previously issued)
5. An identifier can be assigned on a first-come-first-served basis;

for example, an anonymous user may ask for a given identifier (name or 'handle') and providing the request identifier has not been previously registered, it can be assigned.

In an illustrative embodiment, the CA maintains an integer counter and uses a library to convert each number into an alphanumeric string on a one-to-one mapping basis. By way of example, one could use the following 22 character "dictionary" to produce alphanumeric strings (ABCDEF-GHJKUXYZ23456789). Look-alike characters which can be easily mistaken for one another are removed (e.g. the number 1 and the letter I). With 22 characters and, for example, 10 character positions this provides a total of 26,559,922,791,424 possible permutations. The skilled person will readily appreciate that the number of permutations can be increased by expanding the number of positions or size of character set.

In an alternative approach, integers can be mapped to a large dictionary of words. A certificate name is produced which might resemble, for example, "chance dream father rock". With a word list that is 970 words long, and with 4 positions, a total of 885,292,810,000 permutations are possible.

Before the certificate can be issued, the CA may require that the endpoint which has supplied the public key is also in possession of the corresponding private key. Therefore, the CA requires a demonstration from the endpoint that it has the correct private key. The CA issues a random challenge (eg a nonce value) to the endpoint. The endpoint signs the challenge with their private key and sends the signature back to the CA along with their CSR 2. This provides evidence that the endpoint owns the private key and is not trying to trick the CA into signing a public key that the endpoint does not own.

The digital certificate is then created and signed by the CA 3 and returned to the endpoint or entity which requested it 5. Typically this happens in near real-time and as a machine-to-machine communication between the endpoint and CA without the involvement of the end user. The certificate generation/issue process can be fully automated and be performed almost instantaneously, without any user interaction required to request and receive an issued certificate. The digital certificate includes the endpoint's public key and the SIN generated by the CA as the certificate's distinguished name. The endpoint stores the certificate, along with the corresponding private key it generated, for future use 6.

Every endpoint which wishes to connect with others via the infrastructure of the invention also obtains at least one certificate from the CA. Thereafter, when endpoints wish to connect, they can take on the responsibility of identity validation (pairing a distinguished name with a real-world identity, and deciding which distinguished names their software should be willing to communicate with) for themselves by exchanging the distinguished names 19 on their certificates in-person, and out of band from the protected communications channel.

Figure 3:
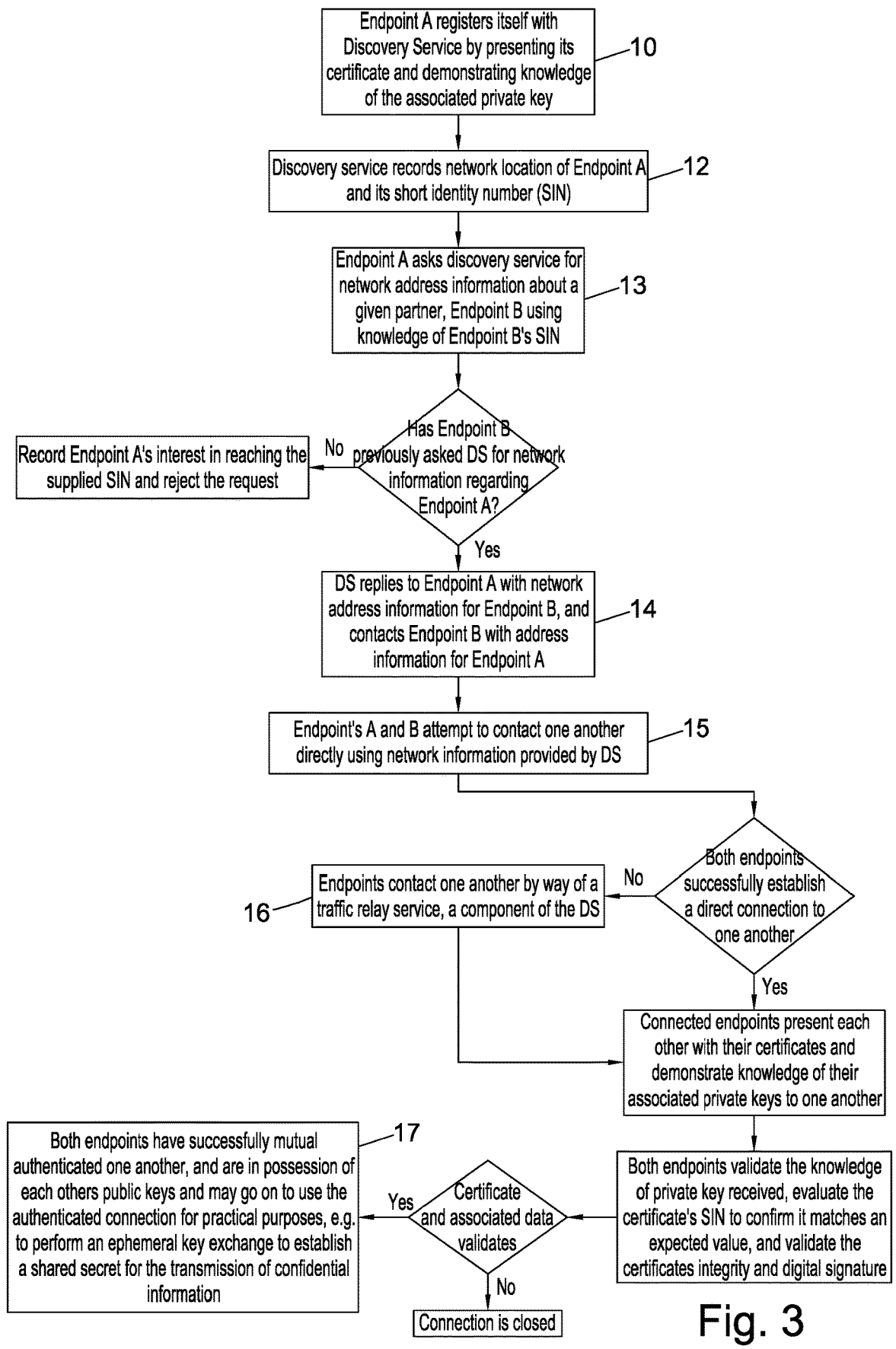
FIG. 3 illustrates an automatic public key exchange performed in accordance with an illustrative embodiment of the invention.
Figure 4:
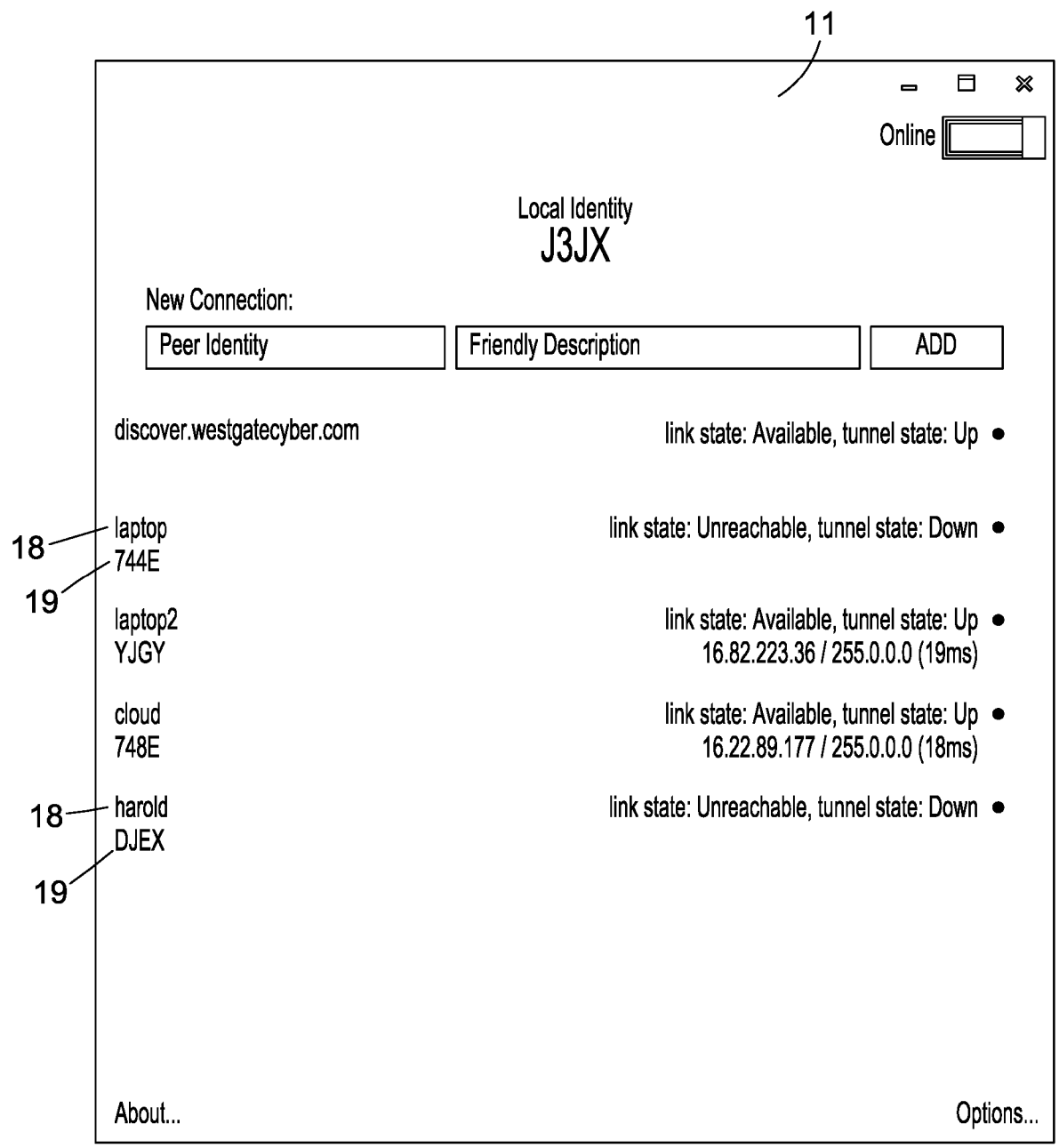
FIG. 4 shows a screen shot in accordance with an illustrative embodiment of the invention, and illustrates a system used by parties who have desire to connect with one another.

In order to connect with each other, endpoints register their presence on the network with a discovery service 11 as shown in FIG. 4, and in step 10 of FIG. 3. Each endpoint provides the DS with its certificate as issued by the CA, along with a demonstration of knowledge of the private key associated with the public key in the certificate. The DS 11 records the respective network locations and/or reachability information relating to the endpoints 12.

Figure 2:
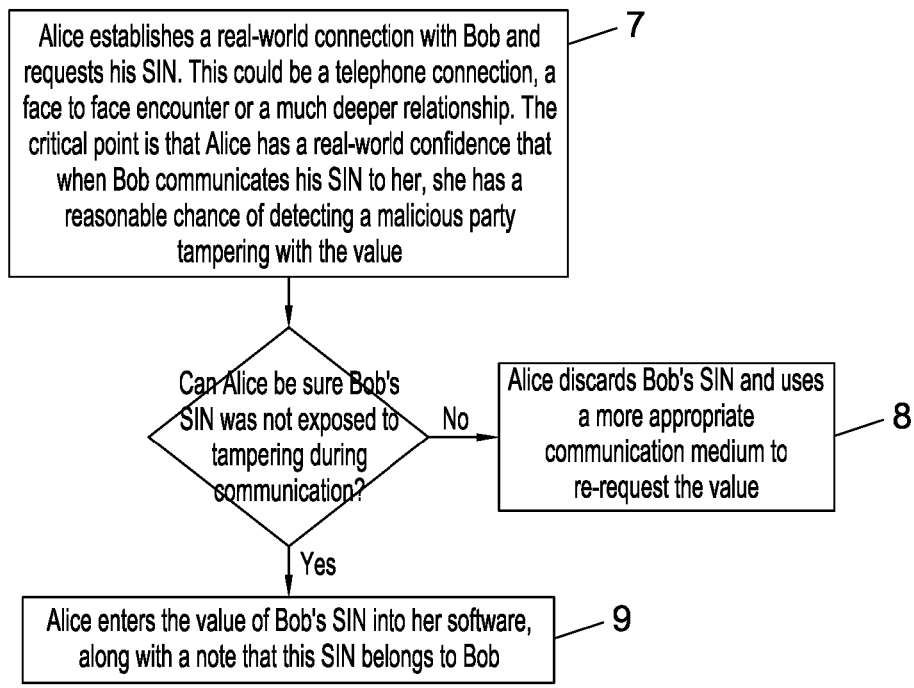
FIG. 2 illustrates a manual exchange of short identity numbers (SINs) as performed in accordance with an illustrative embodiment of the invention.

Endpoints wishing to establish a connection exchange the distinguished names from their respective digital certificates to perform the validation—see FIG. 2. Both endpoints (eg Alice and Bob) need to be sure that the respective certificates they have received are genuinely from the expected source. The distinguished name is not a secret value and can be openly and freely exchanged. However, each endpoint must be able to say with a high degree of certainty that the distinguished name they have verbally or visually received has actually come from the other endpoint. This is possible because the users have some prior knowledge or evidence relating to each other's identities e.g. Alice knows Bob's phone number, or knows what he looks/sounds like, or they have met in person.

FIG. 2 shows the exchange of SINs in an illustrative embodiment of the invention. The users can transmit their distinguished names using any chosen method of communication. However, in order to ensure that the transmission has not been intercepted by a man in the middle attack, real-time mediums of communication are preferred for exchanging SINs. Telephone conversations or in-person exchanges of SINs make it difficult for a malicious actor to intercept and alter the distinguished names during an exchange. If an exchange of distinguished names is to occur between computers rather than humans, an administrator may publish a list of distinguished names at a trusted URL to which the software may refer.

In accordance with the invention, exchanging distinguished names via third parties in non-real time is not recommended as it potentially exposes endpoints to a man-in-the-middle attack which could see the distinguished name altered before it reaches the intended. Instant messaging, email, and text messages are insecure methods of communication in that message integrity is not guaranteed, and so they present unauthorised parties with the opportunity to intercept and alter the distinguished name 19 in transit during an exchange. If the recipient cannot detect tampering, the security of the method is undermined and both parties are potentially exposed to a man-in-the-middle attack. It should be noted that the data flow depicted in FIG. 2 illustrates a one-way exchange of distinguished names 19. However, in order for mutual authentication to take place all endpoints in a given group must fully exchange their distinguished names.

As shown in FIG. 2, for example, Alice establishes a real-world connection with Bob and requests his SIN. This could be a telephone connection a face to face encounter or a much deeper relationship. Importantly, Alice has a real-world confidence that when Bob communicates his SIN 19 to her, she has a reasonable chance of detecting a malicious party tampering with the value 7. If Alice cannot be sure that the SIN was not exposed to tampering during communication, Alice discards Bob's SIN and uses a more appropriate communication medium to re-request the SIN 8. If, on the other hand, she is sure that the SIN was not tampered with, she enters the value of Bob's SIN 19 into her DS software, along with a note or indicator 18 that this SIN belongs to Bob 9.

Once the endpoints have exchanged distinguished names, the discovery service 11 helps each endpoint locate and connect with other endpoints that made a mutual assertion that they wish to connect, so that they may then present each other with their respective certificates. This is explained in FIG. 3. For example, Alice contacts the discovery service and requests reachability information for a distinguished name she received from Bob 13. Providing Bob has made a similar request to the DS using the distinguished name he obtained from Alice, the discovery service 11 will provide each endpoint with the necessary reachability information 14 so that they may 15 attempt to establish a direct network connection and begin a certificate exchange. The endpoints contact each other using a traffic relay service provided as a component of the DS 16.

To illustrate the above process, suppose that Alice tells Bob (eg via telephone or in person) that the distinguished name on her certificate is AFF9. As Bob knows Alice in some real-world way e.g. they have met in person, Bob can be sure that if he sees an authentic certificate from a mutually trusted CA with a distinguished name of AFF9 then the public key signed into that certificate belongs to Alice. Whichever endpoint sent Bob a certificate with a distinguished name of AFF9 must also have access to the corresponding private key, otherwise when required by Bob to demonstrate knowledge of the private key (e.g. by signing a random nonce of Bob's choosing) they will be unable to do so, allowing Bob to detect an impersonation attempt using Alice's certificate.

Thus, the endpoints are able to mutually verify one another using their real-world knowledge of each other. The short, user-friendly distinguished names facilitate their exchange between human users via digitally signed certificates.

As shown in FIG. 3, once public keys are exchanged, and the endpoints have a communication channel established between one another, the endpoints may conduct a secure communication via any known method or protocol. For example, a key exchange algorithm (such as ECDHE) and a signature algorithm (such as EdDSA) may be used reliably to establish a shared secret, and thereby enable confidential communication between the endpoints 17.

Thus, compared to the conventional approach, the invention provides:
- reduced dependency upon trusted third parties to perform identity validation
- a novel use of CSR which does not contain information about the applicant
- a novel use of the CA to generate a SIN value which serves as a distinguished name which is bound to a public key in response to a certificate signing request (CSR)
- a requirement for real-world users to perform identity validation amongst themselves
- a requirement for real-world users to manually exchange distinguished names on their certificates before communication can take place
- a discovery service which provides network address information to endpoints based on distinguished names
- a discovery service which also provides a traffic relay capability between endpoints should they fail to establish a direct network connection with one another for any reason.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware.

The mere fact that certain measures are recited in mutually different dependent claims does not indicate that a combination of these measures cannot be used to advantage.

The invention claimed is:

1. A computer-implemented method for validating respective identities of first and at least a second co-operating entities on a computer network, the method comprising:
    generating a signed digital certificate comprising:
        a first public key associated with the first co-operating entity on the computer network; and
        a first arbitrary identifier associated with the first public key;
    transmitting the first signed digital certificate to the first entity on the computer network;
    generating a second signed digital certificate comprising:
        a second public key associated with the second co-operating entity on the computer network; and
        a second arbitrary identifier associated with the second public key;
    transmitting the signed digital certificate to the second entity on the computer network;
    providing the first signed digital certificate to a Discovery Service;
    providing the second signed digital certificate to the Discovery Service; and
    using the Discovery Service to locate and connect the first and second co-operating entities after the first and second co-operating entities have each received each other's arbitrary identifiers.

2. A method according to claim 1, wherein the first and second arbitrary identifier is arbitrary such that the identity of the first entity and the second co-operating entity cannot be discerned from the identifier alone and its generation is random or pseudo-random.

3. A method according to claim 1, wherein:
    the first and second digital certificate is generated and/or issued by a Certificate Authority;
    the first and second digital certificate is generated in response to a Certificate Signing Request; and/or
    the first and second digital certificate is transmitted from said first or second co-operating entity to at least one other co-operating entity on the network.

4. A method according to claim 1, further comprising:
    generating the first and second arbitrary identifier using information selected from the group consisting of i) a dictionary, ii) a hash or obfuscation function, iii) a random or pseudo-random data source, iv) first-come-first-served basis, and/or v) an incrementing counter.

5. A method according to claim 1, further comprising:
    receiving the first and second arbitrary identifiers by the first and second co-operating entities.

6. A method according to claim 5, wherein:
    the receiving the first and second arbitrary identifiers is conducted in person or some other manner which enables or facilitates detection of a man-in-the-middle attack, or reduces the likelihood of such an attack.

7. A method according to claim 1, wherein:
    the first entity and the second entity each provide an indication of knowledge of the private key associated with their public key.

8. A method according to claim 7, wherein:
    the indication of knowledge is provided to i) a Certificate Authority as part of a Certificate Signing Request and/or ii) at least one other entity as part of a validation or certificate exchange process and/or iii) the Discovery Service and/or iv) relay services to a plurality of entities on a computer network.

9. A method according to claim 1, wherein:
    the first arbitrary identifier is short relative to the first public key; and
    the second arbitrary identifier is short relative to the second public key.

10. A network of systems comprising:
    an entity system and at least one co-operating entity system coupled together by a data communication network, wherein the entity system and co-operating entity system each comprise a computing device;
    a certificate authority system and a discovery service system coupled to the data communication network, wherein the certificate authority system and the discovery service system comprise at least one computer device; and
    wherein the certificate authority system is configured to generate a signed digital certificate for the entity system and communicate the signed digital certificate to the entity system, wherein the signed digital certificate for the entity system includes i) a first public key associated with the entity system and having a corresponding private key and ii) a first arbitrary identifier associated with the first public key,
    wherein the certificate authority system is configured to generate a signed digital certificate for the co-operating entity system and communicate the signed digital certificate to the co-operating entity system, wherein the signed digital certificate for the co-operating entity system includes i) a second public key associated with the co-operating entity system and having a corresponding private key and ii) a second arbitrary identifier associated with the second public key, and
    wherein the entity system is configured to provide the first signed digital certificate to the discovery service system, the co-operating entity system is configured to provide the second signed digital certificate to the discovery service system, and the discovery service system is used to locate and connect the entity system and the co-operating entity system after the entity and co-operating entity systems have each received each other's arbitrary identifiers.

11. A network of systems according to claim 10, wherein:
    the certificate authority system is arranged and configured to generate the signed digital certificate of the entity system in response to a Certificate Signing Request from the entity system; and
    the certificate authority system is arranged and configured to generate the signed digital certificate of the co-operating entity system in response to a Certificate Signing Request from the co-operating entity system; and the certificate authority system is arranged and configured to maintain a record of digital certificates generated by the certificate authority system.

12. A network of systems according to claim 10, wherein:

the discovery service system is arranged to provide directory, registration and/or relay services to a plurality of entity systems on the data communication network.

13. A network of systems according to claim 10, wherein:

the discovery service system is arranged and configured to access and/or update a register of entities in response to a registration request from an entity system on the data communication network.

14. A network of systems according to claim 10, wherein:

the discovery service system is arranged to i) record location of an entity system on the data communication network based on registration made using a digital certificate of the entity system and/or ii) introduce entity systems to one another.

15. A network of systems according to claim 10, wherein:

the discovery service system is arranged to transmit a network address and/or reachability information for an entity system on the data communication network to another entity system.

* * * * *